United States Patent Office 3,260,702
Patented July 12, 1966

3,260,702
DECOLORIZED AND STABILIZED ORGANIC
POLYISOCYANATE COMPOSITIONS
Tomohisa Murakami, Kanagawa-ken, Shinichi Morisaki, Yokosuga-shi, and Koshiro Hiiro, Yokohama, Japan, assignors to Hodogaya Chemical Co., Ltd., Tokyo, Japan, a corporation of Japan
No Drawing. Filed June 4, 1963, Ser. No. 285,197
11 Claims. (Cl. 260—77.5)

This invention relates to decolorized and stabilized organic polyisocyanates prepared by adding to an organic polyisocyanate 0.001 to 1% by weight, based on the weight of the organic polyisocyanate, of a material selected from the group consisting of compounds containing 1 to 4 ethyleneimine rings in the molecule.

At present, organic polyisocyanates are used in large amounts in the field of synthetic chemistry as the starting materials for coatings, foams, elastomers and the likes. Although they are colorless immediately after production, most of the organic polyisocyanates tend to become colored during storage or during the steps of reacting them with materials having active hydrogen, such as alcohols, amines or water. Various processes for preventing organic polyisocyanates from such coloring have been patented and announced, but none of the processes has been sufficiently satisfactory for the stabilization of organic polyisocyanates, which particularly tend to be colored.

In order to prevent organic polyisocyanates from coloring, the present inventors have investigated the coloration-preventing actions of various materials on organic polyisocyanates to find that most of the materials containing ethyleneimine rings prevent them from coloring. Particularly, it has been discovered that not only the majority of the materials containing ethyleneimine rings prevent organic polyisocyanates from coloring but the addition of a minute amount of said materials enables colored organic polyisocyanates to be decolorized, without injuring the original quality of the organic polyisocyanates, which has conventionally been considered impossible. It has also been found that, in synethesizing polyurethane or polyurea compounds from organic polyisocyanates and compounds having a plurality of hydroxyl or amino groups, the addition of the materials containing ethyleneimine rings or the use of organic polyisocyanates to which said materials have been added makes it possible to form less colored or difficultly coloring polyurethane or polyurea compounds.

Therefore, an object of the present invention is to prevent organic polyisocyanates from coloring during storage.

Another object is to decolor colored organic polyisocyanates.

A further object is the synthesize less colored or difficulty coloring polyurethane or polyurea compounds from organic polyisocyanates and compounds having a plurality of hydroxyl or amino groups.

There are very many materials containing etheyleneimine rings which are usable for the above objects. It is rather difficult, according to the experiments conducted by the present inventors, to find ethyleneimine ring-containing materials having no coloration-preventing or decoloring action. These materials have the following general formulas, wherein R' is a lower alkyl, cycloalkyl, aryl, or aralkyl group; —R— is a lower alkylene, cycloalkylene, arylene, or aralylene group; X is O, S or NH; Y is O or S; and

represents an ethyleneimine ring. Compounds containing one ethyleneimine ring include:

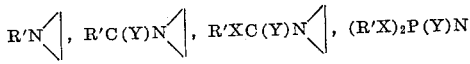

Compounds containing two ethyleneimine rings include:

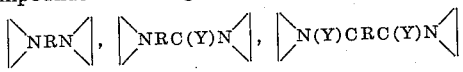

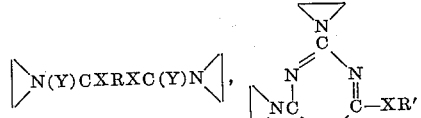

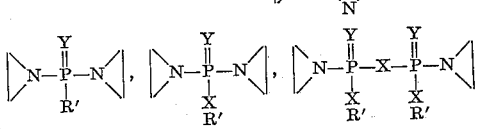

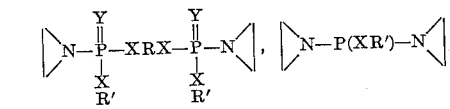

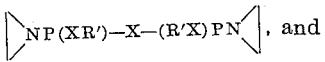, and

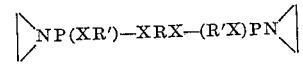

Compounds containing three or more ethyleneimine rings include:

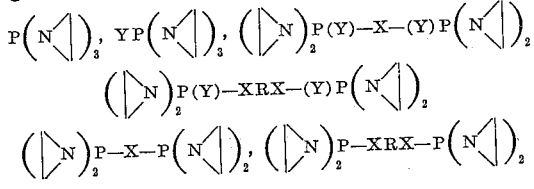

etc.

The present inventors selected as typical compounds of those having the above formulas, 33 ethyleneimine-containing compounds shown in Table 1 and examined the coloration preventing and decolorizing actions thereof on organic polyisocyanates. The results are shown below.

TABLE 1

(1) 1-ethylethyleneimine:

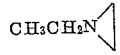

(2) Diethyleneiminophenylmethane:

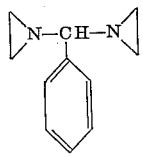

(3) 1-benzylethyleneimine:

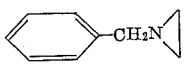

(4) w,w'-p-Xylylenediethyleneimine:

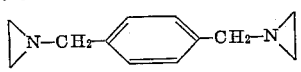

(5) N-phenyl-N′-ethyleneurea:

Ph—NHCON⟨|⟩

(6) N-cyclohexyl-N′-ethyleneurea:

⟨H⟩—NHCON⟨|⟩

(7) N-octyl-N′-ethyleneurea:

C₈H₁₇NHCON⟨|⟩

(8) 1,6-hexamethylenebisethyleneurea:

⟨|⟩NCONH(CH₂)₆NHCON⟨|⟩

(9) 2,4-tolylenebisethyleneurea:

(structure with CH₃, NHCON⟨|⟩ groups)

(10) 4,4′-diphenylmethanebisethyleneurea:

⟨|⟩N—CONH—⟨⟩—CH₂—⟨⟩—NHCHN⟨|⟩

(11) N-phenyl-N′-ethylenethiourea:

Ph—NHCSN⟨|⟩

(12) N-cyclohexyl-N′-ethylenethiourea:

⟨H⟩—NHCSN⟨|⟩

(13) 1-acetylethyleneimine:

CH₃C(O)N⟨|⟩

(14) 1-benzoylethyleneimine:

PhC(O)N⟨|⟩

(15) Adipobis(1-ethyleneimine):

⟨|⟩NC(O)—(CH₂)₄—CN⟨|⟩(O)

(16) Terephthalobis(1-ethyleneimine):

⟨|⟩NC(O)—⟨⟩—CN⟨|⟩(O)

(17) Ethoxycarbonyl-1-ethyleneimine:

CH₃CH₂OC(O)N⟨|⟩

(18) Phenoxycarbonyl-1-ethyleneimine:

⟨⟩—OC(O)N⟨|⟩

(19) Hexamethylenebisethyleneurethane:

⟨|⟩NC(O)O(CH₂)₆OC(O)N⟨|⟩

(20) Tris-(1-ethyleneimino)-phosphine oxide:

OP(N⟨|⟩)₃

(21) Bis-(1-ethyleneimino)-phenoxyphosphine-oxide:

⟨⟩—OP(O)(N⟨|⟩)₂

(22) Bis(1-ethyleneimino) phosphoxy anilide:

(N⟨|⟩)₂PONH—⟨⟩

(23) Pyrophosphoric acid tetraethyleneimine:

(⟨|⟩N)₂P(O)OP(O)(N⟨|⟩)₂

(24) Ethyleneglycol-bis(diethyleneiminophosphate):

(⟨|⟩N)₂P(O)OCH₂CH₂OP(O)(N⟨|⟩)₂

(25) Tris-(1-ethyleneimino)phosphinesulfide:

SP(N⟨|⟩)₃

(26) Bis-(1-ethyleneimino)butoxyphosphine sulfide:

C₄H₉OP(S)(N⟨|⟩)₂

(27) 1,4-Cyclohexanediol-bis(diethyleneiminothiophosphate):

(⟨|⟩N)₂P(S)—O—⟨H⟩—O—P(S)(N⟨|⟩)₂

(28) Ethyleneglycol-bis(diethyleneiminothiophosphate):

(⟨|⟩N)₂P(S)OCH₂CH₂OP(S)(N⟨|⟩)₂

(29) Ethylphosphonic acid diethyleneimine:

C₂H₅P(O)(N⟨|⟩)₂

(30) Phenylphosphonic acid diethyleneimine:

⟨⟩—P(O)(N⟨|⟩)₂

(31) Phosphorous triethyleneimine:

P(N⟨|⟩)₃

(32) Butoxy-bis-(1-ethyleneimino)-Sym-triazine:

(triazine structure with N⟨|⟩ groups and OC₄H₉)

(33) Cyclohexylamino-bis-(1-ethyleneimino)-S-triazine:

(triazine structure with N⟨|⟩ groups and NH-cyclohexyl)

Generally, the suitable amount of decolorizing and stabilizing agents to be added to organic polyisocyanates is 0.001–1%, preferably 0.01–0.5% by weight, based on the weight of the organic polyisocyanates, though it varies depending on the kind of organic polyisocyanates, degree of color thereof, kind of said agent used and storage conditions of organic polyisocyanates. These decolorizing and stabilizing agents may be added singly, but their coloration-preventing effect is frequently increased when they are used in combination with hydroxyaryl compounds or alkyl- or alkoxy-substituted hydroxyaryl compounds, which have conventionally been known as coloration preventing agents, such as, for example, p-cresol, 4,4′-dioxydiphenyl, 2,6-di-tert-butyl-4-methylphenol, 2,6-di-tert-butylmethoxyphenol, 4,4′-dioxydiphenylmethylethylmethane, bis-(2-hydroxy-3-tert-butyl-5-methylphenyl) methane, hydroquinone and pyrogallol. In this case, the preferable amount of hydroxyaryl compounds or alkyl- or alkoxy-substituted hydroxyaryl derivatives to be added is 0.01 to 0.5% by weight based on the weight of organic polyisocyanates.

The decolorizing and stabilizing agents of the present invention are effectively employed for many organic polyisocyanates but mainly for those shown below:

1,4-tetramethylenediisocyanate
1,6-hexamethylenediisocyanate
1,4-cyclohexanediisocyanate
ω,ω'-m-Xylylenediisocyanate
ω,ω'-p-Xylylenediisocyanate
1,3-phenylenediisocyanate
Chlorobenzene-2,4-diisocyanate
2,4-tolylenediisocyanate
Any mixtures of 2,4-tolylenediisocyanate and 2,6-tolylenediisocyanate.
4,4'-methylenebis (phenylisocyanate)
4,4'-diphenyldiisocyanate
4,4'-diphenyletherdiisocyanate
1,5-naphthylenediisocyanate The present decolorizing and stabilizing agents are also effective for the decoloration and prevention of coloration of organic polyisocyanates having terminal isocyanate groups which have been synthesized from organic diisocyanates and water, organic diamino compounds or polyhydric alcohols, such as trimethylol propane, butanediol, polyether polyol, or polyester polyol.

The effect of the present decolorizing and stabilizing agents will be illustrated with reference to the following examples.

Although certain preferred embodiments of the invention have been disclosed for purpose of illustration, it will be evident that various changes and modifications may be made therein without departing from the invention.

Example 1

Thirty-three samples each of 20 ml. of 4,4'-methylenebis(phenylisocyanate), which had been colored to 250 measured in terms of A.P.H.A. number [(unit measured on the Hazen (cobalt-platinum) scale as determined by the method described on pages 87–89 of "Standard Methods for the Determination of Water, Sewerage, and Industrial Wastes" (10th edition, 1955, published by the American Public Health Association)], were charged into colorless 30 ml. ampoules. 0.003 g. of each material shown in Table 1 was added to respective ampoules, which were then sealed. After thorough mixing, the ampoules were stored in a dark place at 40° C. to examine the variation in the degree of coloration. The results are shown in Table 2, in which the numbers of respective additives represent those of the compounds shown in Table 1, and 0 shows the case where no material was added.

TABLE 2

| Time (hr.) | No. of additive | Degree of coloration (A.P.H.A. No.) |
| --- | --- | --- |
| 100 | 3, 4, 11, 15, 19, 20, 21, 23, 24, 25, 26, 27, 28, 29, 30, 31 | <100 |
|  | 6, 7, 10, 13, 14, 16, 17, 18, 22, 32 | 100~150 |
|  | 1, 2, 5, 8, 9, 12, 33 | 150~250 |
|  | 0 | 400 |
| 1,000 | 3, 4, 19, 21, 23, 26, 27, 29, 31 | <100 |
|  | 6, 7, 10, 11, 13, 14, 15, 16, 17, 18, 20, 22, 24 | 100~200 |
|  | 1, 2, 5, 12, 33 | 200~300 |
|  | 8, 9 | 300~400 |
|  | 0 | 900 |

Example 2

Fourteen samples each of 20 ml. of tolylene diisocyanate (an 80/20 mixture of 2,4- and 2,6-isomers), which had been colored to 400 measured on the basis of A.P.H.A., were charged into 14 30 ml. colorless ampoules. To the ampoules, the material shown in Table 3 were added and the ampoules were sealed. After thoroughly mixing the contents, the ampoules were stored in a dark place at 40° C. to examine the relation between the storage time and the variation in degree of coloration. The results are shown in Table 3, wherein the numbers of ethyleneimine derivatives represent those of the compounds described in Table 1.

TABLE 3

| Additives | | | Time (hr.) | | | |
| --- | --- | --- | --- | --- | --- | --- |
| Nos. of ethyleneimine derivatives | Amount of derivative added (g.) | Amount of 2,6-di-tert-butyl-4-cresol added (g.) | 1 | 24 | 100 | 1,000 |
| -------- | -------- | -------- | 400 | 500 | 700 | 1,200 |
| 2 | 0.005 | -------- | 70 | 70 | 100 | 350 |
| 10 | 0.005 | -------- | 150 | 200 | 200 | 500 |
| 19 | 0.005 | -------- | 120 | 80 | 150 | 200 |
| 26 | 0.005 | -------- | 50 | 60 | 60 | 350 |
| 29 | 0.005 | -------- | 50 | 100 | 200 | 500 |
| 32 | 0.005 | -------- | 150 | 150 | 150 | 250 |
| -------- | -------- | 0.01 | 400 | 400 | 500 | 600 |
| 2 | 0.005 | 0.01 | 70 | 80 | 80 | 150 |
| 10 | 0.005 | 0.01 | 120 | 150 | 200 | 200 |
| 19 | 0.005 | 0.01 | 100 | 100 | 100 | 150 |
| 26 | 0.005 | 0.01 | 50 | 50 | 50 | 80 |
| 29 | 0.005 | 0.01 | 50 | 70 | 100 | 200 |
| 32 | 0.005 | 0.01 | 120 | 150 | 150 | 150 |

As is clear from the above examples, most of the materials containing ethyleneimine rings in the molecules are excellent, even when used in a minute amount, in decolorizing and coloration-preventing effects on organic polyisocyanates. However, these effects differ more or less depending upon the kind of organic polyisocyanates to be treated. The experiments of the present inventors show that, amoung the compounds set forth in Table 1, those with the numbers of 3, 4, 19, 21, 23, 26, 27, 29, and 31 are excellent. However, by increasing the addition amount, other ethyleneimine derivatives than the above compounds are also usable as commercially valuable modifying agents.

Example 3

100 parts of polytetramethylene ether glycol having a hydroxyl value of 106 were heated to 100° C. and dried in vacuum, while stirring, for one hour at 3 mm. Hg. To the resulting material, 38.2 parts of 4,4'-methylenebis (phenylisocyanate) were added to react therewith for 10 minutes. To the reaction product, 52 parts of tetramethylene glycol were added and the resulting mixture was thoroughly stirred to form, about 5 minutes later, a homogeneous viscous material. This material was poured into a vessel, to which a silicone backing had been applied, and allowed to stand in a heater at 130° C. for about 3 hours to form an elastomer free from plasticity. Subsequently, a suitable amount of the elastomer was cut and weighed in an iron mold to which a silicone backing had been applied. After preheating to 160° C., the elastomer was subjected to compression molding for 15 minutes at 100 kg./cm.$^2$ by use of a hot press heated to 160° C. to obtain a yellow brown, translucent, elastic shaped article. The same operations as above were repeated using as a starting material 4,4'-methylenebis (phenylisocyanate) decolorized and stabilized with the addition of 0.01% of tris-(1-ethyleneimine) phosphine oxide, whereby a light yellow-brown shaped article was obtained. Thus, the effect resulting from the addition of the decolorizing and stabilizing agent is marked.

Example 4

73 g. of tolylene diisocyanate (an 80/20 mixture of 2,4- and 2,6-isomers) were added to a mixture comprising 121 g. of a propylene oxide addition-product of trimethylolpropane having a hydroxyl value of 413, 0.75 g. of dibutyltindilaurate, 1.2 g. of a surface active agent (siloxane-oxyalkylene polymer) and 35.5 g. of trichloromonofluoromethane, while thoroughly stirring the latter mixture. Immediately after the initiation of foaming, the resulting mixture was charged in a mold and heated to 70° C. for 30 minutes to obtain a white rigid foamed material with a density of about 0.03 g./cm.² When exposed directly to the sun for one month, the foamed material was colored to yellow brown. The same operations as above were repeated, using as a starting material tolylenediisocyanate which had been decolorized and stabilized with the addition of ethyleneglycol bis-(diethyleneimino thiophosphate) in an amount of 0.01% by weight, to obtain a foamed material. Even when allowed to stand under the same conditions as above, the foamed material was only slightly colored. Thus, the effect derived from the addition of the decolorizing and stabilizing agent is conspicuous.

What we claim is:

1. A decolorized and stabilized organic polyisocyanate composition which comprises an organic polyisocyanate and 0.001 to 1% by weight, based on the weight of the organic polyisocyanate, of a material selected from the group consisting of compounds having the general formulas of

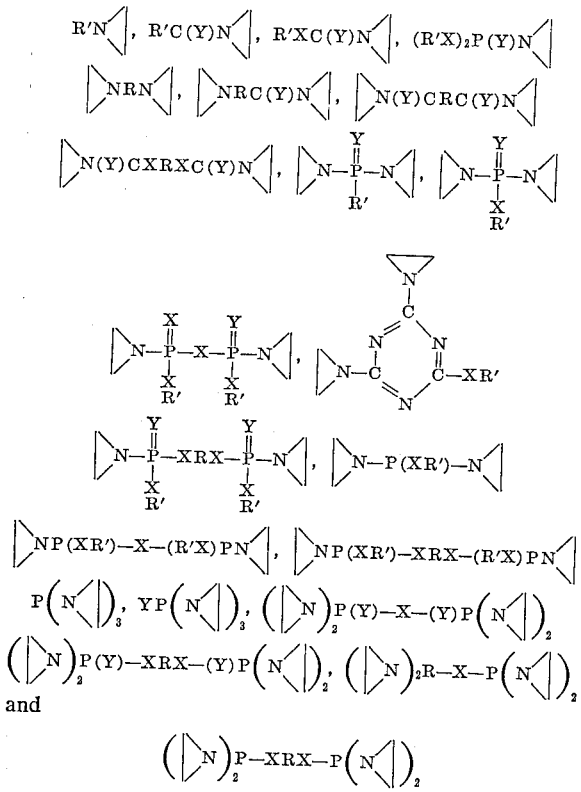

wherein R' is selected from the group consisting of lower alkyl, cycloalkyl, aryl and aralkyl groups, R is selected from the group consisting of lower alkylene, cycloalkylene, arylene and aralkylene groups, X is selected from the group consisting of O, S or NH, Y is selected from the group consisting of O or S and

represents an ethyleneimine ring.

2. A decolorized and stabilized organic diisocyanate composition which comprises an organic diisocyanate selected from the group consisting of tolylenediisocyanate, ω,ω'-xylylenediisocyanate and 4,4'-methylenebis (phenylisocyanate) and 0.001 to 1% by weight, based on the weight of the diisocyanate, of a material selected from the group consisting of compounds having the general formulas as described in claim 1.

3. A decolorized and stabilized 4,4'-methylenebis (phenylisocyanate) which comprises 4,4'-methylenebis (phenylisocyanate) and 0.001 to 1% by weight, based on the weight of 4,4'-methylenebis (phenylisocyanate), of a material selected from the group consisting of benzyl-ethyleneimine, diethyleneiminophenylmethane and ω,ω'-p-xylylenediethyleneimine.

4. A decolorized and stabilized 4,4'-methylenebis (phenylisocyanate) which comprises a 4,4'-methylenebis (phenylisocyanate) and 0.001 to 1% by weight, based on the weight of the 4,4'-methylenebis (phenylisocyanate), of a material selected from the group consisting of acetylethyleneimine, benzoylethyleneimine, 2,4-tolylenebisethyleneurea and hexamethylenebisethyleneurethane.

5. A decolorized and stabilized 4,4'-methylenebis (phenylisocyanate) which comprises a 4,4'-methylenebis (phenylisocyanate) and 0.001 to 1% by weight, based on the 4,4'-methylenebis (phenylisocyanate), of a material selected from the group consisting of compounds represented by the molecular formulas

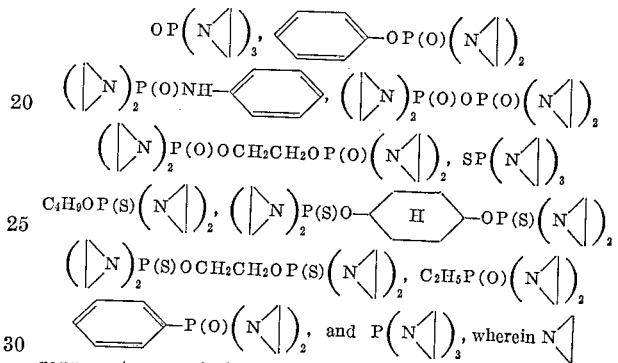

represents an ethyleneimine ring.

6. A decolorized and stabilized 4,4'-methylenebis (phenylisocyanate) which comprises a 4,4'-methylenebis (phenylisocyanate) and 0.001 to 1% by weight, based on the weight of the 4,4'-methylenebis (phenylisocyanate), of a material selected from the group consisting of compounds represented by the molecular formulas

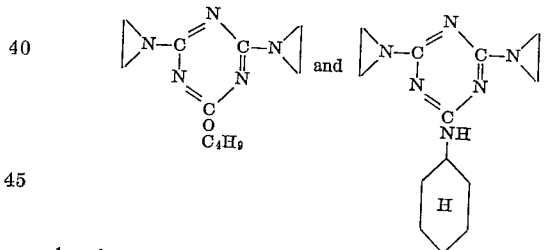

wherein

represents an ethyleneimine ring.

7. A decolorized and stabilized organic polyisocyanate composition which comprises an organic polyisocyanate, 0.001 to 1% by weight, based on the weight of the organic polyisocyanate, of a material selected from the group consisting of compounds having the general formulas of

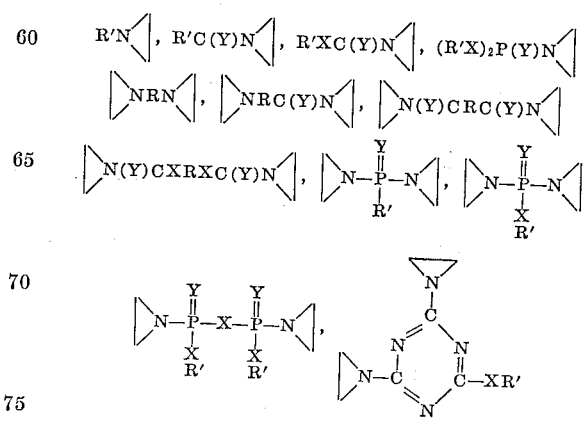

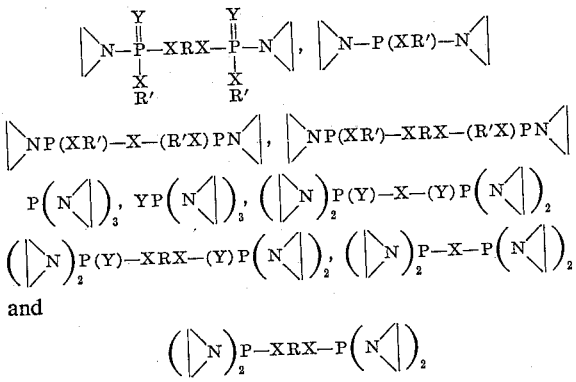

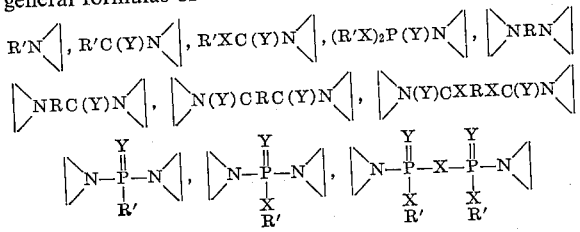

and

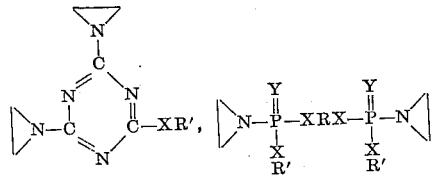

wherein R' is selected from the group consisting of lower alkyl, cycloalkyl, aryl and aralkyl groups, R is selected from the group consisting of lower alkylene, cycloalkylene, arylene and aralkylene groups, X is selected from the group consisting of O, S or NH, Y is selected from the group consisting of O or S and

represents an ethyleneimine ring and 0.01 to 1% by weight, based on the weight of the organic polyisocyanate, of a material selected from the group consisting of hydroxyaryl compounds and alkyl- and alkoxy-substituted compounds thereof.

8. A composition as described in claim 7 wherein the third members are selected from the group consisting of p-cresol, 2,6-di-tert-butyl-4-methylphenol, 2,6-di-tert-butyl-4-methoxyphenol, 4,4'-dioxy-diphenylmethylethylmethane, bis(2-hydroxy-3-tert-butyl-5-methylphenyl)methane, 4,4'-dioxydiphenyl, hydroquinone, and pyrogallol.

9. A method for preventing the coloration of organic polyisocyanates which comprises adding to an organic polyisocyanate 0.001 to 1% by weight, based on the weight of the organic polyisocyanate, of a material selected from the group consisting of compounds having the general formulas of

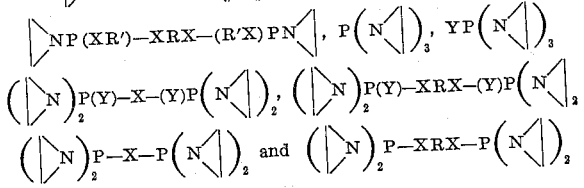

wherein R' is selected from the group consisting of lower alkyl, cycloalkyl, aryl and aralkyl groups, R is selected from the group consisting of lower alkylene, cycloalkylene, arylene and aralkylene groups, X is selected from the group consisting of O, S or NH, Y is selected from the group consisting of O or S, and N represents an ethyleneimine ring.

10. A method for decolorizing organic polyisocyanates which comprises adding to an organic polyisocyanate 0.001 to 1% by weight, based on the weight of the organic polyisocyanate, of a material selected from the group consisting of compounds having the general formulas of

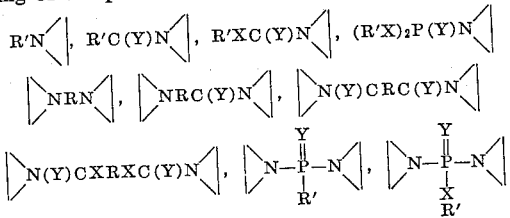

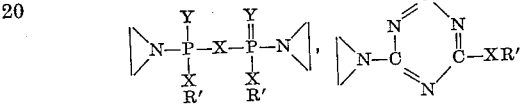

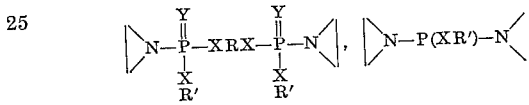

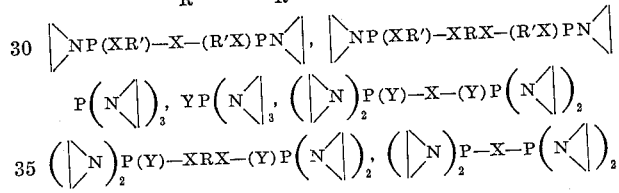

and

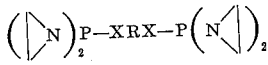

wherein R' is selected from the group consisting of lower alkyl, cycloalkyl, aryl and aralkyl groups, R is selected from the group consisting of lower alkylene, cycloalkylene, arylene and aralkylene groups, X is selected from the group consisting of O, S or NH, Y is selected from the group consisting of O or S, and

represents an ethyleneimine ring.

11. In a method for synthesizing a polyurethane compound from an organic polyisocyanate and a compound having a plurality of hydroxyl groups, an improvement for the production of a less colored polyurethane compound characterized by adding to the organic polyisocyanate 0.001 to 1% by weight, based on the weight of the organic polyisocyanate, of a material selected from the group consisting of compounds having the general formulas of

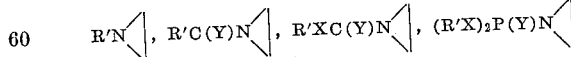

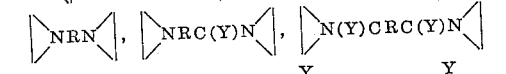

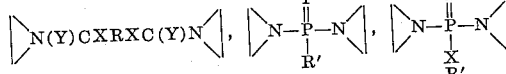

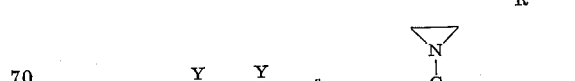

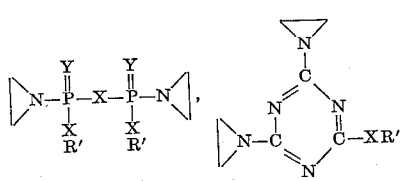

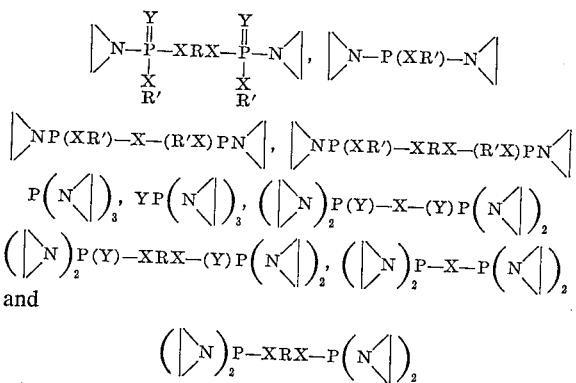

and

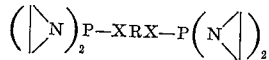

wherein R' is selected from the group consisting of lower alkyl, cycloalkyl, aryl, and aralkyl groups, R is selected from the group consisting of lower alkylene, cycloalkylene, arylene and aralkylene groups, X is selected from the group consisting of O, S or NH, Y is selected from the group consisting of O or S, and

represents an ethyleneimine ring.

References Cited by the Examiner

UNITED STATES PATENTS

| | | | |
|---|---|---|---|
| 1,973,676 | 9/1911 | Voorhees | 252—401 |
| 2,302,288 | 11/1942 | Bestian | 260—239 |
| 2,686,772 | 8/1954 | Bortnick | 260—239 |
| 2,885,420 | 5/1959 | Spiegler | 260—453 |
| 3,006,912 | 10/1961 | Vierling | 252—403 |
| 3,165,509 | 1/1965 | MacKinney | 260—239 |

LEON J. BERCOVITZ, *Primary Examiner.*

M. C. JACOBS, *Examiner.*